(12) United States Patent
Randall et al.

(10) Patent No.: US 7,280,342 B1
(45) Date of Patent: Oct. 9, 2007

(54) LOW INDUCTANCE HIGH ESR CAPACITOR

(75) Inventors: Michael S. Randall, Simpsonville, SC (US); Allen Hill, Simpsonville, SC (US); Peter Blais, Milford, MA (US); Garry Renner, Easley, SC (US); Randal Vaughan, Fountain Inn, SC (US); Azizuddin Tajuddin, Laurens, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 11/639,796

(22) Filed: Dec. 15, 2006

Related U.S. Application Data

(63) Continuation-in-part of application No. 11/334,271, filed on Jan. 18, 2006.

(51) Int. Cl.
*H01G 4/005* (2006.01)
*H01G 4/06* (2006.01)
*H01G 4/228* (2006.01)
(52) U.S. Cl. .................... 361/303; 361/311; 361/306.3
(58) Field of Classification Search ........ 361/303–305, 361/311, 306.3, 309
See application file for complete search history.

(56) References Cited

U.S. PATENT DOCUMENTS

| | | | |
|---|---|---|---|
| 6,292,351 B1 | 9/2001 | Ahiko et al. | |
| 6,496,355 B1 | 12/2002 | Galvagni et al. | |
| 6,765,781 B2 | 7/2004 | Togashi | |
| 6,798,640 B1 | 9/2004 | Novak | |
| 6,950,300 B2 | 9/2005 | Sutardja | |
| 6,956,730 B2 | 10/2005 | Togashi | |
| 6,965,507 B2 | 11/2005 | Togashi et al. | |
| 6,970,342 B1 | 11/2005 | Togashi | |
| 7,054,136 B2 | 5/2006 | Ritter et al. | |
| 7,180,723 B2 | 2/2007 | Togashi et al. | |
| 2001/0002873 A1* | 6/2001 | Tanaka | 361/306.3 |
| 2002/0041006 A1* | 4/2002 | Ahiko et al. | 257/532 |
| 2003/0026059 A1* | 2/2003 | Togashi | 361/303 |

* cited by examiner

*Primary Examiner*—Eric Thomas
(74) *Attorney, Agent, or Firm*—John B. Hardaway, III; Nexsen Pruet, LLC

(57) ABSTRACT

A low inductance multi-layer capacitor. The capacitor comprises interleaved parallel internal electrode plates with dielectric there between. Each internal electrode plate comprises two lead-out tabs and is generally T shaped. A first external electrode terminal is electrically connected to the lead-out tabs of the even internal electrode plates, and a second external electrode terminal is electrically connected to the lead-out tabs of the odd internal electrode plates. The external electrode terminals are on a common first exterior surface and a common opposing second exterior surface of the capacitor.

27 Claims, 4 Drawing Sheets

LOW INDUCTANCE HIGH ESR CAPACITOR

CROSS-REFERENCE TO RELATED APPLICATIONS

This application is a continuation-in-part of U.S. patent Ser. No. 11/334,271, filed Jan. 18, 2006 which is now pending and incorporated by reference.

BACKGROUND

The present invention is related to a low inductance capacitor having two terminals. More particularly, the present invention is related to a low inductance multi-layer capacitor having two terminals which electrically connect to the lead-out tabs of interleaved T shaped electrodes.

In summary, the art has been seeking a low inductance multi-layer capacitor for use in high frequency decoupling applications which is effective and inexpensive to manufacture, as well as simple to use. Recent developments in microprocessors and memory technologies have led to an increased demand for faster switching speeds and greater densities in integrated circuits. Because of these demands, higher operating frequencies or switching speeds are required which cause larger current fluctuations and difficulties in controlling voltage fluctuations accompanying these larger current fluctuations. Today, sophisticated noise filtering techniques are necessary to stabilize these fluctuations.

Decoupling capacitors are often used as a means of overcoming physical and time constraints found in integrated circuits by reducing voltage fluctuations and enhancing the reliability of the device. Commonly, multi-layer ceramic capacitors are used as decoupling capacitors because of their size, availability, density, performance, reliability, and cost. Decoupling capacitors are usually mounted on a printed circuit board ("PCB") in close proximity to the decoupled microprocessor or integrated circuit. By supplying quick charge flow at the event of a high speed transient current fluctuation, the decoupling capacitor supplies a supplemental current, thereby reducing voltage fluctuation of the power source.

As switching speeds and device densities of integrated circuits increase, greater demands are placed on decoupling capacitors. In the past, this demand has been met through the use of larger and larger capacitance value capacitors. The use of larger value capacitors, however, creates two problems. First, there is an ongoing demand for smaller and smaller devices due to the ongoing desire for the miniaturization of electronic apparatuses. Second, the larger the capacitor size, the larger the parasitic inductance becomes. Parasitic inductance is almost always undesirable because it degrades the effectiveness of the capacitor. Capacitors with large parasitic inductances have relatively low resonance frequency combined with relatively high impedance at high frequencies making them unusable for many high-speed applications. The relationship between resonance frequency and capacitance can be expressed in the following equation:

$$f_0 = \frac{1}{2\pi\sqrt{LC}}$$

wherein $f_o$ represents resonance frequency, L represents parasitic inductance, which is suitably estimated as equivalent series inductance ("ESL"), and C represents capacitance. As can be seen, the smaller the inductance L, the higher the resonance frequency $f_o$ becomes.

Mutual inductance is also undesirable in an electric circuit because it causes unwanted coupling between conductors in a circuit. Mutual inductance is the property of an electric circuit or component which generates an electromotive force ("EMF"). Mutual inductance occurs as a result of a change in the current flowing through a neighboring circuit with which it is magnetically linked. In other words, mutual inductance is the voltage induced in one circuit when the current in another circuit changes by a unit amount in unit time. The EMF generated by the presence of mutual inductance maintains a direction which is always opposite the change in the magnetic field.

Low inductance capacitors are known in the art. U.S. Pat. No. 6,950,300 to Sutardja ("the '300 patent") discloses a multilayer capacitor having a low parasitic inductance. A sideways T shaped electrode is vertically oriented and mounted to a PCB. The T extensions are electrically connected to four separate external contact bars at the bottom and top of the capacitor. The distance between the two external contact bars at the top and bottom of the capacitor is reduced to decrease the parasitic inductance. While the '300 patent discloses a capacitor with lower parasitic inductance than standard multilayer capacitors, it does not disclose a capacitor with lower mutual inductance. Furthermore, the '300 patent still maintains a high parasitic inductance due to the limiting surface area of the terminations. The capacitors disclosed in the '300 patent are expensive to manufacture and have limiting mounting capabilities due to the use of separate external contact bar terminations. Furthermore, the external electrodes are only internally connected to the capacitor body.

U.S. Pat. No. 6,496,355 to Galvagni et al. ("the '355 patent") discloses an improved low inductance interdigitated capacitor and corresponding termination scheme. The '355 patent discloses the use of solder stops to create a ball limiting metallurgy and provides for the use of electrode tabs extending from electrode layers which are exposed on the sides of the capacitor body. While the '355 patent provides for a lower parasitic and mutual inductance, both the parasitic and mutual inductance remain high because of the electrode configuration and orientation. Further, the '355 patent requires the use of solder stops and maintains limiting mounting capabilities.

U.S. Pat. No. 7,054,136 to Ritter et al. ("the '136 patent") discloses a multilayer ceramic capacitor assembly capable of exhibiting low high-frequency inductance and a controlled ESR. The '136 patent teaches multi-layered termination wherein the multiple layers reduce thermal shock problems in the capacitor. The use of a serpentine design electrode element is also disclosed to enhance the ESR. The serpentine pattern disclosed in the '136 patent does not effectively reduce ESR because each electrode plate has a wide surface area when the current enters each electrode plate from the termination. Further, the capacitor has a high inductance due to, for example, the electrode configuration and the current passing through multiple faces on the capacitor.

Further multilayer capacitors also known in the art include U.S. Pat. No. 6,292,351 to Ahiko et al., and U.S. Pat. Nos. 6,956,730; 6,965,507; and 6,765,781 and U.S. Publication Nos. 2006/0028785 and 2005/0264977 all to Togashi. These patents do not disclose capacitors with low mutual inductance and provide for capacitors with high parasitic inductance due to the limiting surface area of the interdigitated external terminations. Moreover, the items described in these patents are expensive to manufacture because of the lack of symmetry of the internal electrodes and the limiting mounting capabilities due to the use of separate external contact bar terminations.

In summary, the art has been seeking a multi-layer capacitor which generates low parasitic and mutual inductance in decoupling applications, is compatible with most existing circuit boards, maintains electrode symmetry and which is easily mountable and inexpensive to manufacture.

SUMMARY OF THE INVENTION

It is an object of the present invention to provide a capacitor which eliminates or lowers mutual inductance.

It is another object of the present invention to provide a capacitor which has low parasitic inductance.

It is another object of the present invention to provide a capacitor which has increased effective equivalent series resistance (ESR).

It is yet another object of the present invention to provide a capacitor which has inherently lower equivalent series inductance (ESL) and can therefore be used in high frequency decoupling applications.

An advantage of the present invention is the simplicity of manufacture since the internal electrodes can be manufactured in a manner similar to prior art capacitors.

Another advantage of the present invention is the ease of use and versatile mounting capabilities relative to common interdigitated capacitors because it does not require any change in the design of the circuit board.

Yet another advantage of the present invention is the ability to both internally and externally connect the external electrode terminals to the capacitor body These and other advantages are provided in the capacitor of the present invention. In a particularly preferred embodiment, the capacitor comprises first internal electrode plates and second internal electrode plates which are arranged parallel to each other with dielectric there between. The first internal electrode plates comprise opposing first and second lead-out tabs, a first land, and a first planar element. The first and second lead-out tabs have a combined length greater than the length of the first planar element. Similarly, the second internal electrode plates comprise opposing third and fourth lead-out tabs, a second land, and a second planar element. The third and fourth lead-out tabs have a combined length greater than the length of the second planar element. A first external electrode terminal is electrically connected to the first internal electrode plates by the first and second lead-out tabs, and a second external electrode terminal is electrically connected to the second internal electrode plates by the opposing third and fourth lead-out tabs. Further, the first and second external electrode terminals are on a common first exterior surface and a common opposing second exterior surface of the capacitor.

In another particularly preferred embodiment, the capacitor comprises more than one interleaved internal electrode plate wherein each internal electrode plate is arranged spaced apart in parallel with dielectric there between. Each internal electrode plate comprises a first and second lead-out tab, a land, and a planar element. The first and second lead-out tab have a combined length greater than the length of the planar element. A first external electrode terminal is electrically connected to the first and second lead-out tab of even ones of the internal electrode plates, and a second external electrode terminal is electrically connected to the first and second lead-out tab of odd ones of the internal electrode plates. Both the first external electrode terminal and said second external electrode terminal are each arranged on a common first exterior surface, a common opposing exterior surface, and a perpendicular face between the first exterior surface and the opposing exterior surface of the capacitor.

DETAILED DESCRIPTION OF THE INVENTION

The invention will be described with reference to the accompanying drawings forming an integral part of the present disclosure. In various drawings, similar elements will be numbered accordingly.

Figure 1:
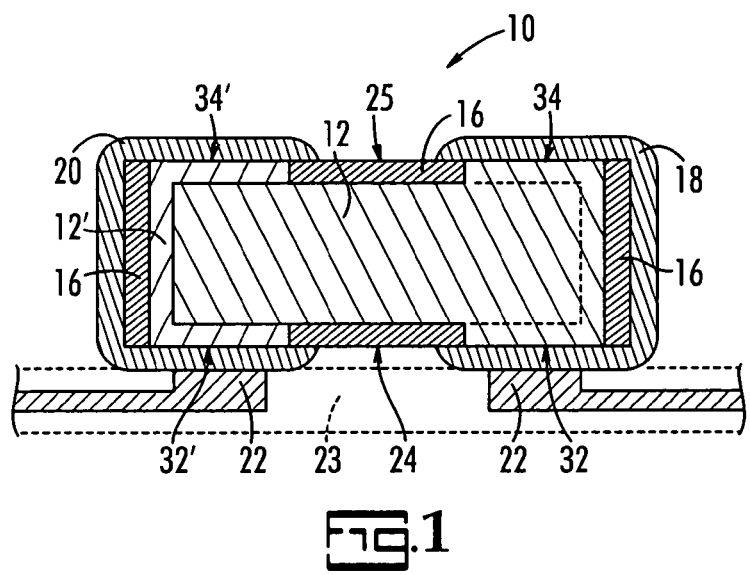
FIG. 1 illustrates a schematic cross-sectional view of a capacitor of the present invention.

A low inductance multilayer capacitor having generally 'T' shaped interleaved internal electrodes and two external electrode terminals is disclosed. A low inductance multilayer capacitor having generally 'T' shaped interleaved internal electrodes is also disclosed in U.S. application Ser. No. 11/334,271 which is incorporated in its entirety herein. FIG. 1 illustrates a capacitor unit, generally represented at 10, comprising a pair of conductive internal electrode plates, 12 and 12' in parallel spaced-apart relationship. For clarity, the elements of the second internal electrode plate will be indicated by primes. The internal electrode plates, 12 and 12', are preferably identical and interleaved with one rotated relative to the other. A dielectric material, 16, is dispersed between the internal electrode plates, 12 and 12'. Two external electrode terminals, 18 and 20 are positioned at opposing ends of the capacitor, 10. The external electrode terminals, 18 and 20, are electrically connected to the internal electrode plates, 12 and 12', respectively. The dielectric material, 16, may also encase the internal electrode plates, 12 and 12', except for the surfaces where the external electrode terminals, 18 and 20, are electrically connected to the internal electrode plates, 12 and 12'. The external electrode terminals, 18 and 20, are attached to the circuit traces, 22, of the circuit board, 23.

In a finished capacitor, multiple overlaid internal electrodes would be arranged in a stacked relationship with dielectric between each internal electrode and its nearest neighbor(s). Each first internal electrode would be electrically connected to a common external electrode. Similarly, each overlaid second internal electrode would be electrically connected to a second common external electrode. As would be realized to one of ordinary skill in the art, the internal electrodes are in a stacked relationship with each internal electrode having opposite polarity to each adjacent internal electrode.

Figure 2:
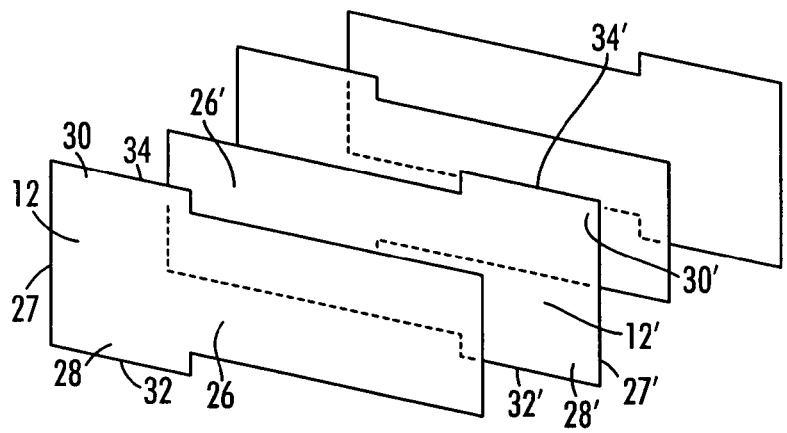
FIG. 2 illustrates the electrode orientation of a capacitor of the present invention.

FIG. 2 illustrates the orientation of a multiplicity of first and second internal electrode plates, 12 and 12', in accordance with one embodiment of the present invention. The internal electrode plates, 12 and 12', are spaced apart in parallel with each other and each comprises a planar electrode element 26 and 26', a first lead-out tab, 28 and 28', a second lead-out tab, 30 and 30', and a land, 27 and 27', respectively. Lead-out tabs are also commonly referred to as lead-out electrodes and extensions in the art. The first lead-out tab, 28 and 28', and second lead-out tab, 30 and 30', of the internal electrode plates, 12 and 12', respectively, form a generally 'T' shape. The lead-out tabs, 28 and 30, of the first internal electrode plates, 12, are positioned in the opposing direction of the lead-out tabs, 28' and 30', of the second internal electrode plates, 12, so that the lead-out tabs, 28 and 30, of the first internal electrode plates, 12, are not overlapping the lead-out tabs, 28' and 30', of the second internal electrode plates, 12'.

The first lead-out tabs, 28 and 28', comprise a first contact face, 32 and 32', which will be on a common face of the capacitor. The second lead-out tabs, 30 and 30', comprise a second contact face, 34 and 34', also on a common face of the capacitor. The contact faces are not encased and extend beyond the dielectric material to connect the internal electrode plates to the external electrode terminals. For example, referring back to FIG. 1, the first and second contact faces, 32 and 34 of the first internal electrode plates, 12, approaches the exterior of the capacitor body for connecting to the first external electrode terminal 18. Likewise, the first and second contact faces, 32' and 34', of the second internal electrode plates, 12', approaches the exterior of the capacitor body for connecting to the second external electrode terminal 20. Further, the contact faces of both internal electrode plates, 12 and 12', terminate on at least two common exterior surfaces. First contact faces, 32 and 32', of the first and second internal electrode plates, 12 and 12', electrically connect to an external electrode terminals, 18 and 20, on a first common exterior surface, 24, and second contact faces, 34 and 34', of the first and second internal electrode plates, 12 and 12', electrically connect to an external electrode terminals, 18 and 20, on an opposing common exterior surface, 25.

The lead-out tabs can have either linear or non-linear side edges. In a particularly preferred embodiment, as shown, the side edges are linear and extend at approximately a ninety degree angle from the contact faces. A primary advantage to this embodiment is the simplicity of manufacture. In another embodiment, the side edges of the lead-out tabs are linear and diverge outward from the contact faces creating a generally trapezoidal shape. In yet another embodiment, the side edges of the lead-out tabs are non-linear and radial. Any lead-out tab shape is suitable for demonstration of the present invention as long as the generally 'T' shape is maintained yet complicated functions are not necessary and merely add manufacturing complexity. Some complexity to the generally 'T' shape as discussed below and illustrated in FIGS. 6 through 9, however, may be particularly advantageous.

Figure 6:
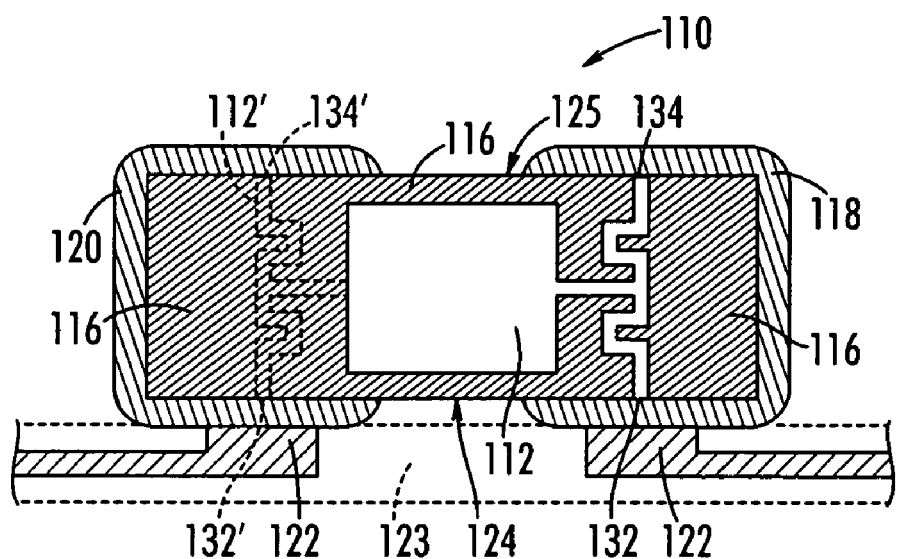
FIG. 6 illustrates a schematic cross-sectional view of a capacitor of the present invention.
Figure 7:
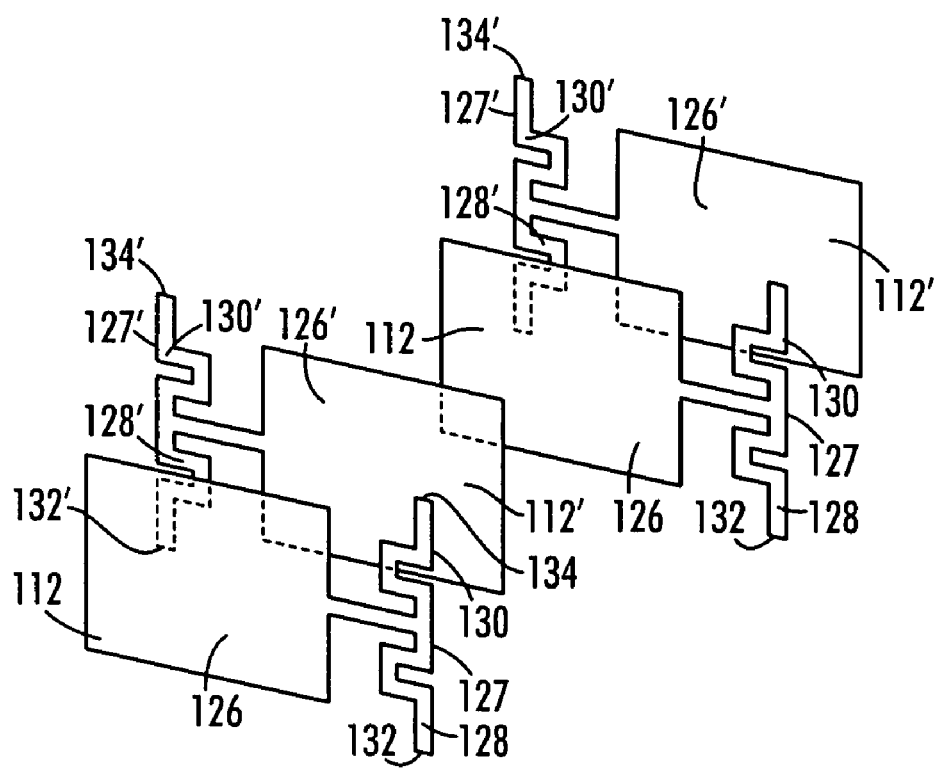
FIG. 7 illustrates the electrode orientation of a capacitor of the present invention.

FIG. 6 illustrates another embodiment of the present invention wherein the capacitor is generally represented at 110 and has a multiplicity of generally 'T' shaped first and second internal electrode plates, 112 and 112', each having a serpentine pattern portion. Referring to FIG. 7, the internal electrode plates, 112 and 112', are spaced apart in parallel with each other and each comprises a planar electrode element 126 and 126', a first lead-out tab, 128 and 128', a second lead-out tab, 130 and 130', and lands, 127 and 127', respectively. The first lead-out tab, 128 and 128', and second lead-out tab, 130 and 130', of the internal electrode plates, 112 and 112', respectively, form a serpentine or tortuous pattern which together with the planar electrode element 126 and 126 for a generally 'T' shape. The serpentine or tortuous pattern is designed to increase the path length to path width within the physical constraints of package size. As the path length to path width increases, the ESR increases. A serpentine path involving at least one change in direction is preferred for manufacturing simplicity. A serpentine path involving at least 2 changes in direction is also highly preferred. The lead-out tabs, 128 and 130, of the first internal electrode plates, 112, are positioned in the opposing direction of the lead-out tabs, 128' and 130', of the second internal electrode plates, 112, so that the lead-out tabs, 128 and 130, of the first internal electrode plates, 112, are not overlapping the lead-out tabs, 128' and 130', of the second internal electrode plates, 112'.

The first lead-out tabs, 128 and 128', comprise a first contact face, 132 and 132', which will be on a common face of the capacitor. The second lead-out tabs, 130 and 130', comprise a second contact face, 134 and 134', also on a common face of the capacitor. The contact faces are not encased and extend beyond the dielectric material to connect the internal electrode plates to the external electrode terminals. For example, referring to FIG. 6, the first and second contact faces, 132 and 134 of the first internal electrode plates, 112, approaches the exterior of the capacitor body for connecting to the first external electrode terminal 118. Likewise, the first and second contact faces, 132' and 134', of the second internal electrode plates, 112', approaches the exterior of the capacitor body for connecting to the second external electrode terminal 120. Further, the contact faces of both internal electrode plates, 112 and 112', terminate on at least two common exterior surfaces. First contact faces, 132 and 132', of the first and second internal electrode plates, 112 and 112', electrically connect to an external electrode terminals, 118 and 120, on a first common exterior surface, 124, and second contact faces, 134 and 134', of the first and second internal electrode plates, 112 and 112', electrically connect to an external electrode terminals, 118 and 120, on an opposing common exterior surface, 125.

Figure 8:
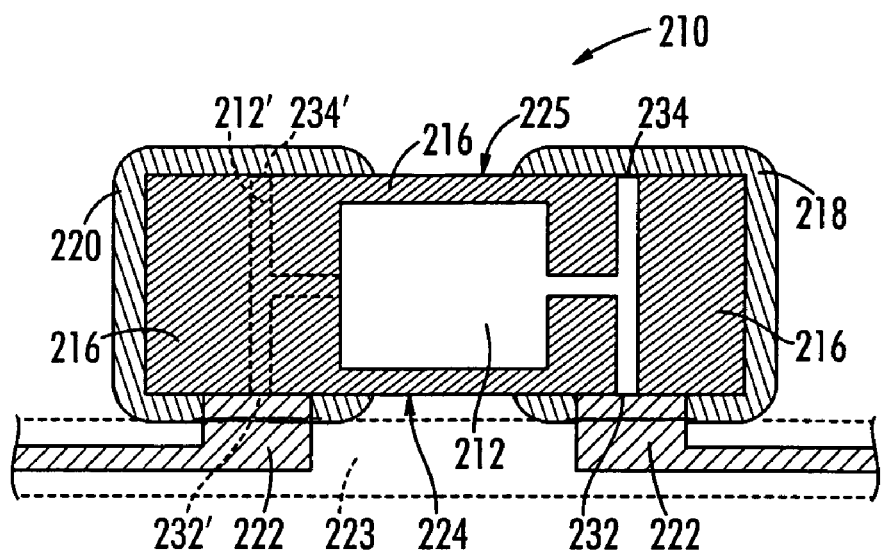
FIG. 8 illustrates a schematic cross-sectional view of a capacitor of the present invention.
Figure 9:
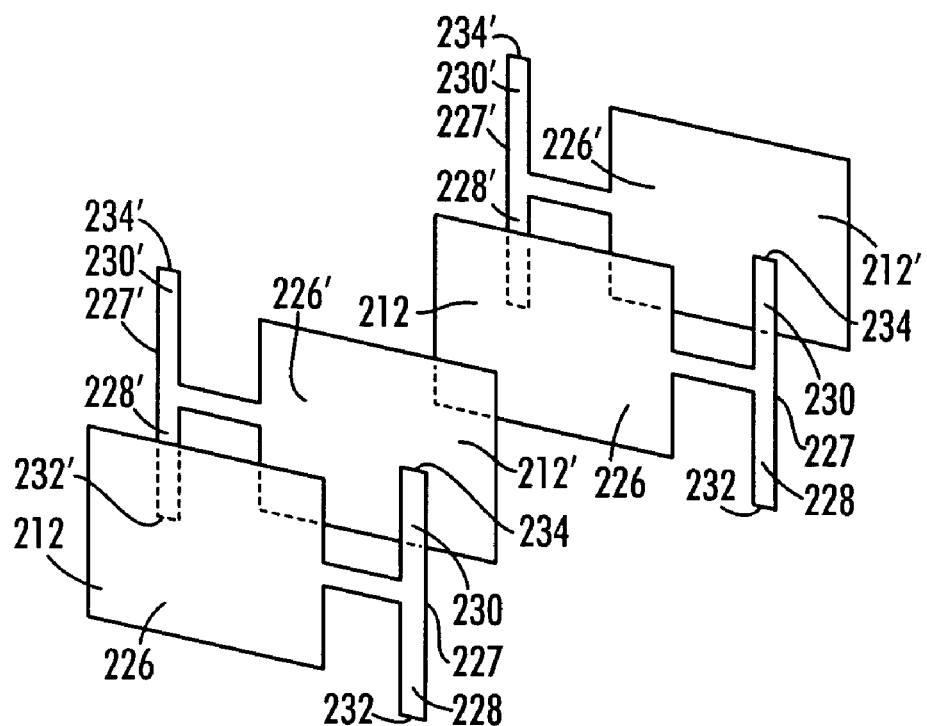
FIG. 9 illustrates the electrode orientation of a capacitor of the present invention.

Similar to FIG. 6, FIG. 8 illustrates yet another embodiment of the present invention wherein the capacitor is generally illustrated at 210 and has a multiplicity of generally 'T' shaped first and second internal electrode plates, 212 and 212', each having a thin strip portion. Referring to FIG. 9, the internal electrode plates, 212 and 212', are spaced apart in parallel with each other and each comprises a planar electrode element 226 and 226', a first lead-out tab, 228 and 228', a second lead-out tab, 230 and 230', and a land, 227 and 227', respectively. The first lead-out tab, 228 and 228', and second lead-out tab, 230 and 230', of the internal electrode plates, 212 and 212', respectively, form a thin strip which together with the planar electrode element 226 and 226' for a generally 'T' shape. The lead-out tabs, 228 and 230, of the first internal electrode plates, 212, are positioned in the opposing direction of the lead-out tabs, 228' and 230', of the second internal electrode plates, 212, so that the lead-out tabs, 228 and 230, of the first internal electrode plates, 212, are not overlapping the lead-out tabs, 228' and 230', of the second internal electrode plates, 212'.

The first lead-out tabs, 228 and 228', comprise a first contact face, 232 and 232', which will be on a common face of the capacitor. The second lead-out tabs, 230 and 230', comprise a second contact face, 234 and 234', also on a common face of the capacitor. The contact faces are not encased and extend beyond the dielectric material to connect the internal electrode plates to the external electrode terminals. For example, referring to FIG. 8, the first and second contact faces, 232 and 234 of the first internal electrode plates, 212, approaches the exterior of the capacitor body for connecting to the first external electrode terminal 218. Likewise, the first and second contact faces, 232' and 234', of the second internal electrode plates, 212', approaches the exterior of the capacitor body for connecting to the second external electrode terminal 220. Further, the contact faces of both internal electrode plates, 212 and 212', terminate on at least two common exterior surfaces. First contact faces, 232 and 232', of the first and second internal electrode plates, 212 and 212', electrically connect to an external electrode terminals, 218 and 220, on a first common exterior surface, 224, and second contact faces, 234 and 234', of the first and second internal electrode plates, 212 and 212', electrically connect to an external electrode terminals, 218 and 220, on an opposing common exterior surface, 225.

The lead-out tabs of the embodiment shown in FIGS. 6 through 9 are particularly preferable for increasing the effective ESR of the electrode plates. As discussed above, this increased effective ESR is due to the electrode plate patterns wherein the current entering each electrode plate has to run through a lead out tab having a narrow strip with an increased length thereby increasing the effective ESR. Electrode designs outside of those illustrated in FIGS. 6 through 9 are contemplated. For Example, a serpentine shape having a more complex pattern with multiple curves would be particularly preferred because of the increased length of the lead out tabs. The more complex the serpentine shape, however, the more complicated the manufacturing complexity. Further due to the manufacturing complexity, there is also potential for an increase in the cost of manufacturing the capacitor. Accordingly, a shape with fewer curves than FIGS. 6 and 7 or practically no curves such as shown in FIGS. 8 and 9 are also desirable because they are less expensive to manufacture and still maintain a higher ESR than standard multilayer ceramic capacitors. Any lead-out tab shape is suitable for demonstration of the present invention as long as the combined length of the lead out tabs for each internal electrode is greater than the length of the planar electrode element. The combined length of the lead out tabs is defined as the distance of the electrode path formed by the lead-out tabs between the contact faces. It is also preferable that the generally 'T' shape is maintained. It would be understood that the lead-out tabs of the present invention are preferably integral with the internal electrode plate.

The entire capacitor, except for the contact faces of the internal electrode plate lead-out tabs, may be encased in an insulating material. The insulating material is nonconductive and forms an envelope that electrical charge can neither enter nor escape except through the external electrodes under normal operating conditions. In one particularly preferred embodiment, the insulating material is a dielectric material such as a ceramic.

The present invention is a two external electrode terminal design. In general, each external electrode terminal at least partially covers at least three sides of a capacitor body. The internal electrode plates are electrically connected to the external electrode terminals on at least two common sides. The two external electrode terminal design is especially advantageous over common interdigitated capacitors because the surface area of the external electrode terminal is large and covers at least three sides of the capacitor body which allows the current to flow into a greater area resulting in a lower inductance. Furthermore, the two external electrode terminals can be arranged at a minimal distance from each other to even further minimize parasitic inductance and minimize stress fractures of the capacitor. A two terminal design is also an industry standard for surface mount capacitor technology, which simplifies design and manufacturing costs considerably.

Figure 3:
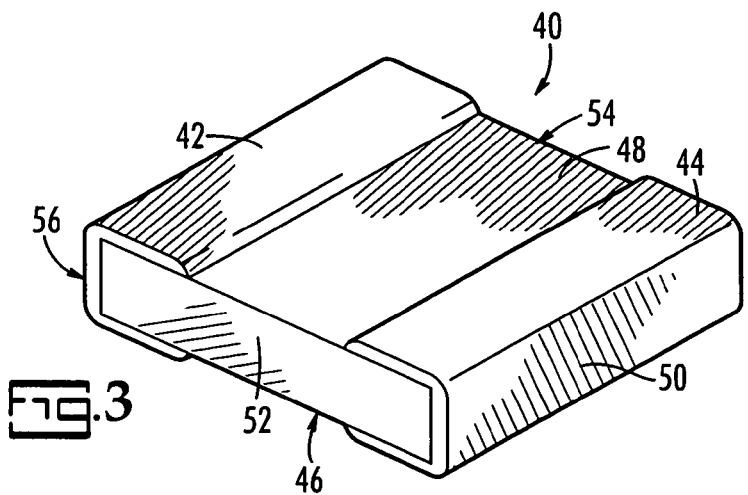
FIG. 3 is a three dimensional view of an embodiment of the present invention having terminals covering three sides of the capacitor.

An embodiment of the present invention is provided in FIG. 3. In FIG. 3, a capacitor, 40, is illustrated comprising a capacitor body having a first exterior surface, 46, an opposing exterior surface 48, four perpendicular faces, 50, 52, 54, and 56, and having two external electrode terminals, 42 and 44. Each external electrode terminal, 42 and 44, at least partially encases at least three surfaces of the capacitor body. In the illustrated embodiment, the first external electrode terminal, 42, partially encases the first exterior surface, 46, and the opposing exterior surface, 48, and completely encases a first perpendicular face, 54. Likewise, the second external electrode terminal, 44, partially encases the first exterior surface, 46, and the opposing exterior surface, 48, and completely encases a second perpendicular face 50. The capacitor body shown in FIG. 3 is similar to that shown in FIGS. 1, 6 and 8 above. In FIG. 1, the contact faces, 32 and 34, of each first internal electrode lead-out tab, 28 and 30, respectively, are in electrical connection with external electrodes, 42, at the first exterior surface, 46, and the opposing exterior surface, 48. Similarly, the contact faces, 32' and 34', of each second internal electrode lead-out tab, 28' and 30', respectively, are in electrical connection with external electrode, 44, at the first exterior surface, 46, and the opposing exterior surface, 48. The internal electrodes plates, 12 and 12', are electrically connected on two common external surfaces, 46 and 48. Similarly, in FIG. 6, the contact faces, 132 and 134, of each first internal electrode lead-out tab, 128 and 130, respectively, are in electrical connection with external electrodes, 42, at the first exterior surface, 46, and the opposing exterior surface, 48. Similarly, the contact faces, 132' and 134', of each second internal electrode lead-out tab, 128' and 130', respectively, are in electrical connection with external electrode, 44, at the first exterior surface, 46, and the opposing exterior surface, 48. The internal electrodes plates, 112 and 112', are electrically connected on two common external surfaces, 46 and 48. In FIG. 8, the contact faces, 232 and 234, of each first internal electrode lead-out tab, 228 and 230, respectively, are in electrical connection with external electrodes, 42, at the first exterior surface, 46, and the opposing exterior surface, 48. Similarly, the contact faces, 232' and 234', of each second internal electrode lead-out tab, 228' and 230', respectively, are in electrical connection with external electrode, 44, at the first exterior surface, 46, and the opposing exterior surface, 48. The internal electrodes plates, 212 and 212', are electrically connected on two common external surfaces, 46 and 48.

In a preferred embodiment, the internal electrode plate lands, 27 and 27', are not electrically connected to the external electrode terminals, 42 and 44, at the perpendicular faces, 50, 52, 54, and 56. So that the internal electrode plate lands, 27 and 27', are not electrically connected to the external electrode terminals, 42 and 44, an insulating material, such as a dielectric, may be positioned between the internal electrode plate lands, 27 and 27', and the external electrode terminals, 42 and 44. This embodiment is preferred because it allows both internal and external connection of the external electrode terminals to the capacitor body. Internal Electrode plate lands 127, 127', 227, and 227' are optionally also not electrically connected to the external electrode terminals as discussed above with respect to lands 27 and 27'.

Figure 4:
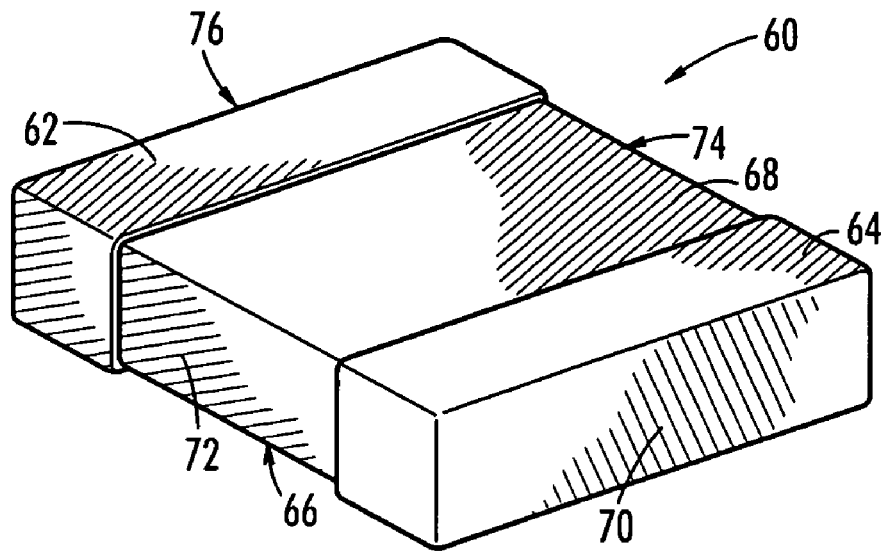
FIG. 4 is a three dimensional view of an embodiment of the present invention having terminals covering five sides of the capacitor.

Another particularly preferred embodiment of the present invention is provided in FIG. 4. In FIG. 4, a capacitor, 60, is illustrated comprising a capacitor body having a first exterior surface, 66, an opposing exterior surface 68, and four perpendicular faces, 70, 72, 74, and 76, and having two external electrode terminals, 62 and 64. In the illustrated embodiment, each external electrode terminal, 60 and 62, at least partially encases five surfaces of the capacitor body. The first external electrode terminal, 62, partially encases the first exterior surface, 66, the opposing exterior surface, 68, a first of four perpendicular faces 72, and a second of four perpendicular faces, 76, and completely encases a third perpendicular face, 74. Likewise, the second external electrode terminal, 64, partially encases the first exterior surface, 66, the opposing exterior surface, 68, a first of four perpendicular faces 72, and a second of four perpendicular faces, 76, and completely encases a fourth perpendicular face 70. The capacitor body shown in FIG. 4 is similar to that discussed in regards to FIG. 3 above. With respect to FIG. 1, the contact faces, 32 and 34, of each first internal electrode lead-out tab, 28 and 30, respectively, are in electrical connection with external electrode terminal, 62, at the first exterior surface, 66, and the opposing exterior surface, 68. Similarly, the contact faces, 32' and 34', of each second internal electrode lead-out tab, 28' and 30', respectively, are in electrical connection with external electrode terminals, 64, at the first exterior surface, 66, and the opposing exterior surface, 68. The internal electrodes plates, 12 and 12', are electrically connected on two common external surfaces, 66 and 68. Similarly, with respect to FIG. 6, the contact faces, 132 and 134, of each first internal electrode lead-out tab, 128 and 130, respectively, are in electrical connection with external electrode terminal, 62, at the first exterior surface, 66, and the opposing exterior surface, 68. Similarly, the contact faces, 132' and 134', of each second internal electrode lead-out tab, 128' and 130', respectively, are in electrical connection with external electrode terminals, 64, at the first exterior surface, 66, and the opposing exterior surface, 68. The internal electrodes plates, 112 and 112', are electrically connected on two common external surfaces, 66 and 68. With respect to FIG. 8, the contact faces, 232 and 234, of each first internal electrode lead-out tab, 228 and 230, respectively, are in electrical connection with external electrode terminal, 62, at the first exterior surface, 66, and the opposing exterior surface, 68. Similarly, the contact faces, 232' and 234', of each second internal electrode lead-out tab, 228'- and 230', respectively, are in electrical connection with external electrode terminals, 64, at the first exterior surface, 66, and the opposing exterior surface, 68. The internal electrodes plates, 212 and 212', are electrically connected on two common external surfaces, 66 and 68.

In a preferred embodiment, the internal electrode plate lands, 27 and 27', are not electrically connected to the external electrode terminals, 62 and 64 at the perpendicular faces, 70, 72, 74, and 76. So that the internal electrode plate lands, 27 and 27', are not electrically connected to the external electrode terminals, 62 and 64, an insulating material, such as a dielectric, may be positioned between the internal electrode plates, 12 and 12', and external electrodes terminals, 62 and 64. This embodiment is preferred because it allows both internal and external connection of the external electrode terminals to the capacitor body. Internal Electrode plate lands 127, 127', 227, and 227' are optionally also not electrically connected to the external electrode terminals as discussed above with respect to lands 27 and 27'. The embodiment illustrated in FIG. 4 is particularly preferred due to the simplicity of manufacture. For example, a dipping process may be used to attach the external electrode terminals to each end of the capacitor body. The embodiment illustrated in FIG. 4 is also a preferred termination design because it allows for mounting the capacitor in various positions.

Figure 5:
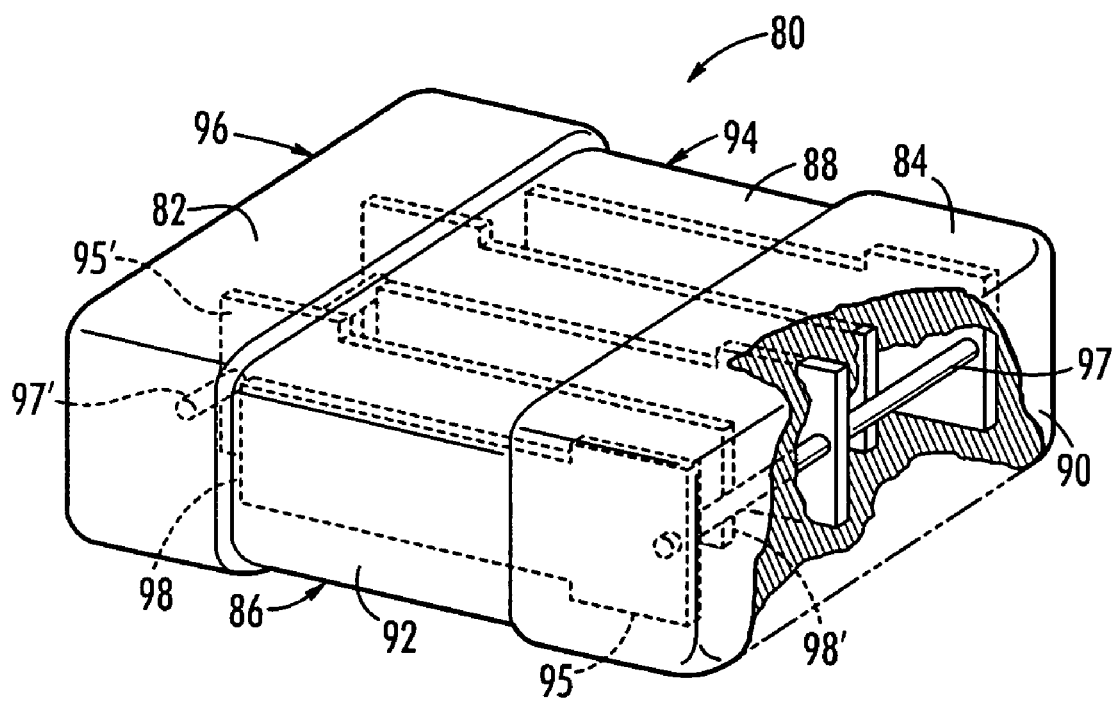
FIG. 5 is a partial cut-away view of an embodiment of the present invention utilizing vias to further electrically connect the electrodes of the capacitor.

FIG. 5 represents yet another embodiment of the present invention. In this embodiment, a capacitor, 80, is illustrated. The internal electrode plates, 95 and 95', terminate on two common first and opposing exterior surfaces, 86 and 88, similar to FIGS. 3 and 4, however, the internal electrodes also terminate on two common first and second perpendicular faces, 92 and 94, through the use of vias, 97 and 97'. In this embodiment, a first via 97 is electrically connected to the first internal electrode plates, 95 and a second via, 97', is electrically connected to the second internal electrode plates, 95'. Each internal electrode plate, 95 and 95', includes a passage for the insertion of the via and the via extends through the capacitor body. The via, 97 and 97', may terminate on only a first common face, 92, of the capacitor body or it may also terminate on a second common face of the capacitor body, 94. When a via is used, the internal electrode plates, 95 and 95', are offset. For example, in the illustrated embodiment, the first and second internal electrode plates, 95 and 95', are offset so that the first internal electrode plate ends, 98, do not contact the via, 97', electrically connected to the second internal electrode plates, 95'. Likewise, the second internal electrode plate ends, 98', do not contact the via, 97, electrically connected to the first internal electrode plates, 95. Multiple vias may be electrically connected to the internal electrodes plates without departing from the scope of the present invention. Further, other embodiments of the internal electrode plates including those contemplated in FIGS. 6 through 9 may utilize vias using a similar technique as described above.

In the embodiment illustrated in FIGS. 1, 6 and 8, the internal electrode plates are vertically oriented with the circuit board when mounted. This is a particularly preferred embodiment because it eliminates the mutual inductance between the circuit traces and the capacitor due to the current paths entering and exiting the same face of the capacitor. Additionally, the electrode design of the present invention promotes inductive cancellation through mutual inductance of adjacent electrodes. While vertical orientation is preferred, the electrodes may also be oriented at any angle with the circuit board when mounted including horizontally oriented with the circuit board. Like vertical orientation, these orientations also have a reduced mutual and parasitic inductance over standard capacitors. The present invention can be mounted on multiple sides of the external electrode terminals and does not require any change in the design of the circuit board which is an enormous advantage over common interdigitated capacitors. In a particularly preferred embodiment, the aspect ratio (thickness to width) of the capacitor body is approximately 0.9 or less. This aspect ratio ensures vertical orientation of the vertical electrodes during mounting so that no additional design is required by the end user while maximizing ESR without significantly increasing inductance.

The invention has been described with particular emphasis on the preferred embodiments without limit thereto.

Based on the foregoing description, other embodiments and alterations would be apparent without departing from the scope of the invention which is more specifically set forth in the claims appended hereto.

The invention claimed is:

1. A capacitor comprising:
   first internal electrode plates;
   second internal electrode plates arranged parallel to said first internal electrode plates with dielectric between;
   wherein said first internal electrode plates comprise a first and second lead-out tab, a first land, and a first planar element, wherein said first and second lead-out tab have a first combined length greater than a first length of said first planar element;
   wherein said second internal electrode plates comprise an opposing third and fourth lead-out tab, a second land, and a second planar element, wherein said third and fourth lead-out tab have a second combined length greater than a second length of said second planar element;
   a first external electrode terminal electrically connected to said first internal electrode plates by said first and second lead-out tab;
   a second external electrode terminal electrically connected to said second internal electrode plates by said opposing third and fourth lead-out tab; and
   wherein said first external electrode terminal and said second external electrode terminal are on a common first exterior surface and a common opposing second exterior surface of the capacitor.

2. The capacitor of claim 1 wherein said first combined length and said second combined length are the same.

3. The capacitor of claim 1 wherein said first length of said first planar element is the same as said second length of said second planar element.

4. The capacitor of claim 1 wherein said first internal electrode plate is symmetrical to said second internal electrode plate.

5. The capacitor of claim 1 wherein said first and second external electrode terminals are not electrically connected to said first and second internal electrode plate by said first and second land, respectively.

6. The capacitor of claim 1 wherein said first external electrode terminal and said second external electrode terminal are on a common third exterior surface and a common fourth exterior surface of the capacitor.

7. The capacitor of claim 1 wherein when said first and second external terminals are connected to a substrate.

8. The capacitor of claim 7 wherein said first and second internal electrode plates of said capacitor are oriented perpendicular to said substrate.

9. The capacitor of claim 7 wherein said first and second internal electrode plates of said capacitor are oriented parallel to said substrate.

10. The capacitor or claim 1 wherein said first internal electrode plates are offset to said second internal electrode plates such that said first end does not extend to said second land and said second end does not extend to said first land.

11. The capacitor of claim 10 wherein at least one first via electrically connects said first external electrode terminal to said first internal electrode plates.

12. The capacitor of claim 11 wherein at least one second via electrically connects said second external electrode terminal to said second internal electrode plates.

13. The capacitor of claim 1 wherein said first internal electrode plate forms a generally 'T' shape.

14. The capacitor of claim 1 wherein said first and second lead-out tab form a serpentine pattern.

15. The capacitor of claim 1 wherein a first width of said first and second lead-out tab is less than a second width of said first planar element.

16. The capacitor of claim 15 wherein a third width of said third and fourth lead-out tab is less than a fourth width of said second planar element.

17. A capacitor comprising:
    m interleaved internal electrode plates;
    wherein each internal electrode plate of said m internal electrode plates are arranged spaced apart in parallel with dielectric between;
    wherein m is an integer greater than 1;
    wherein each said internal electrode plate comprises a first and second lead-out tab, a land, and a planar element, wherein said first and second lead-out tab have a combined length greater than a length of said planar element;
    a first external electrode terminal electrically connected to said first and second lead-out tab of even ones of said m internal electrode plates;
    a second external electrode terminal electrically connected to said first and second lead-out tab of odd ones of said m internal electrode plates; and
    wherein said first external electrode terminal and said second external electrode terminal are each arranged on a common first exterior surface, a common opposing exterior surface, and a perpendicular face between said first exterior surface and said opposing exterior surface of the capacitor.

18. The capacitor of claim 17 wherein said first external electrode terminal and said second external electrode terminal are not electrically connected to said m internal electrode plates by said lands.

19. The capacitor of claim 17 wherein said first external electrode terminal and said second external electrode terminal are on a common first perpendicular face and a common second perpendicular face between said first exterior surface and said opposing exterior surface of the capacitor.

20. The capacitor of claim 17 wherein said first external electrode terminal and said second external electrode terminal are connected to a substrate.

21. The capacitor of claim 20 wherein said m internal electrode plates of said capacitor are oriented perpendicular to the substrate.

22. The capacitor of claim 20 wherein said m internal electrode plates of said capacitor are oriented parallel to said substrate.

23. The capacitor or claim 17 wherein said m internal electrode plates are offset such that said ends of said even ones of said m electrode plates do not extend to said lands of said odd ones of said m electrode plates and said ends of said odd ones of said m electrode plates do not extend to said lands of said even ones of said m electrode plates.

24. The capacitor of claim 23 wherein at least one first via electrically connects said first external electrode terminal to said even ones of said m internal electrode plates.

25. The capacitor of claim 24 wherein at least one second via electrically connects said second external electrode terminal to said odd ones of said m internal electrode plates.

26. The capacitor of claim 17 wherein said first internal electrode plate forms a generally 'T' shape.

27. The capacitor of claim 17 wherein said first and second lead-out tab form a serpentine pattern.

* * * * *